United States Patent
Breun et al.

(10) Patent No.: US 8,848,775 B2
(45) Date of Patent: Sep. 30, 2014

(54) CIRCUIT FOR SIGNAL PROCESSING AND METHOD PERFORMED BY SUCH CIRCUIT

(75) Inventors: Peter Breun, Munich (DE); Joachim Wehinger, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 55 days.

(21) Appl. No.: 13/597,404

(22) Filed: Aug. 29, 2012

(65) Prior Publication Data

US 2014/0064335 A1 Mar. 6, 2014

(51) Int. Cl.
 *H03H 7/30* (2006.01)

(52) U.S. Cl.
 USPC .......................................... 375/232

(58) Field of Classification Search
 USPC ................................. 375/150, 232
 See application file for complete search history.

(56) References Cited

U.S. PATENT DOCUMENTS

| | | | |
|---|---|---|---|
| 2006/0171451 A1* | 8/2006 | Pietraski et al. | 375/232 |
| 2008/0181095 A1* | 7/2008 | Zangi | 370/208 |
| 2009/0290630 A1* | 11/2009 | Pietraski et al. | 375/232 |
| 2011/0142101 A1* | 6/2011 | Cairns | 375/148 |
| 2011/0216811 A1* | 9/2011 | Rowitch | 375/150 |
| 2011/0222455 A1* | 9/2011 | Hou et al. | 370/311 |
| 2012/0087271 A1* | 4/2012 | Blanz et al. | 370/252 |
| 2012/0195211 A1* | 8/2012 | Jonsson et al. | 370/252 |
| 2012/0195358 A1* | 8/2012 | Pan | 375/229 |
| 2012/0281642 A1* | 11/2012 | Sambhwani et al. | 370/329 |
| 2013/0225106 A1* | 8/2013 | Clevorn et al. | 455/226.2 |

* cited by examiner

*Primary Examiner* — Jaison Joseph
(74) *Attorney, Agent, or Firm* — Eschweiler & Associates, LLC (57) ABSTRACT

A method includes receiving a signal transmitted by a transmitter, wherein the transmitter transmits with a transmit power and the signal includes a pilot signal transmitted by the transmitter with a fraction of the transmit power. The method further includes equalizing the received signal, determining a despread pilot signal based on the equalized signal, and determining the fraction of the transmit power based on the despread pilot signal.

23 Claims, 4 Drawing Sheets

CIRCUIT FOR SIGNAL PROCESSING AND METHOD PERFORMED BY SUCH CIRCUIT

FIELD

The present invention relates to signal processing, for example in the field of mobile communications. In particular, the invention relates to circuits for signal processing and methods performed by such circuits.

BACKGROUND

Signals transmitted between a transmitter and a receiver may be corrupted by the physical communication channel. An appropriate signal processing may be required at the receiver side to combat resulting distortions of the transmitted signals. Circuits used in receivers and methods performed by such circuits constantly have to be improved. In particular, it may be desirable to improve a data detection performed by the circuits.

BRIEF DESCRIPTION OF THE DRAWINGS

Aspects of the disclosure are made more evident by way of example in the following detailed description when read in conjunction with the attached drawing figures, wherein.

DETAILED DESCRIPTION

In the following detailed description, reference is made to the accompanying drawings, which form a part thereof, and in which are shown by way of illustration aspects in which the disclosure may be practiced. It is understood that further aspects may be utilized and structural or logical changes may be made without departing from the scope of the present disclosure. The features of the various exemplary aspects described herein may be combined with each other, unless specifically noted otherwise. The following detailed description is therefore not to be taken in a limiting sense and the scope of the present disclosure is defined by the appended claims.

As employed in this specification, the terms "coupled" and/or "connected" are not meant to mean in general that elements must be directly coupled or connected together. Intervening elements may be provided between the "coupled" or "connected" elements. However, although not restricted to that meaning, the terms "coupled" and/or "connected" may also be understood to optionally disclose an aspect in which the elements are directly coupled or connected together without intervening elements provided between the "coupled" or "connected" elements.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

Devices specified herein may be implemented in discrete circuits, partially integrated circuits or fully integrated circuits. In addition, devices in accordance with the disclosure may be implemented on a single semiconductor chip or on multiple semiconductor chips connected to each other. It is understood that components of the specified devices may be implemented in software or in dedicated hardware or partially in software and partially in dedicated hardware.

Devices in accordance with the disclosure may be illustrated in the form of block diagrams. It is understood that separated blocks of such block diagrams do not necessarily relate to hardware components or software components that need to be separated in practice. Rather, it may also be possible that multiple such blocks (in the block diagram) may be implemented in the form of a single component (in practice) or that a single block (in the block diagram) may be implemented in the form of multiple components (in practice).

Block diagrams illustrating methods do not need to necessarily imply a specific chronological order of included method steps. Rather, indicated method steps may be performed in an arbitrary order, if reasonable from a technical point of view. Further, one or more method steps may at least partially be performed at a same time or during a same time period.

In the following, various methods in accordance with the disclosure are described. It is understood that each method may be modified by adding further method steps. In particular, a method may be extended by one or more method steps described in connection with a respective other method. Additional method steps may also be derived by all further parts of this specification, unless specifically noted otherwise. It is understood that specified features of individual methods may be combined in arbitrary ways resulting in further aspects which are not explicitly described for the sake of simplicity.

It is noted that comments made in connection with a described method may also hold true for a corresponding circuit or device configured to perform the method and vice versa. For example, if a specific method step is specified, a corresponding circuit may include a unit to perform the described method step, even if such unit is not explicitly described or illustrated in the figures.

The methods and devices described herein may be used in various wireless communication networks, e.g. CDMA, TDMA, FDMA, OFDMA, SC-FDMA networks, etc. A CDMA network may implement a radio technology such as UTRA, cdma2000, etc. UTRA includes W-CDMA and other CDMA variants. cdma2000 covers IS-2000, IS-95 and IS-856 standards. A TDMA network may implement GSM and derivatives thereof such as, e.g., EDGE, EGPRS, etc. An OFDMA network may implement E-UTRA, UMB, IEEE 802.11 (Wi-Fi), IEEE 802.16 (WiMAX), IEEE 802.20, Flash-OFDM®, etc. UTRA and E-UTRA are part of UMTS. The specified methods and devices may be used in the framework of MIMO (SU-MIMO, MU-MIMO). MIMO is a part of wireless communications standards such as IEEE 802.11n (Wi-Fi), 4G, 3GPP LTE, WiMAX and HSPA+.

Radio communications systems (or networks or systems) as described herein may include one or more receivers (or transceivers) as well as one or more transmitters. A transmitter may be a base station or a transmitting device included in a user's device, such as a mobile radio transceiver, a handheld radio device or any similar device. A receiver may be included in a mobile radio transceiver or a mobile station. For example, a mobile station may be represented by a cellular phone, a smartphone, a tablet PC, a laptop, etc. Circuits as described herein may e.g. be included in such receivers or transceivers.

Figure 1:
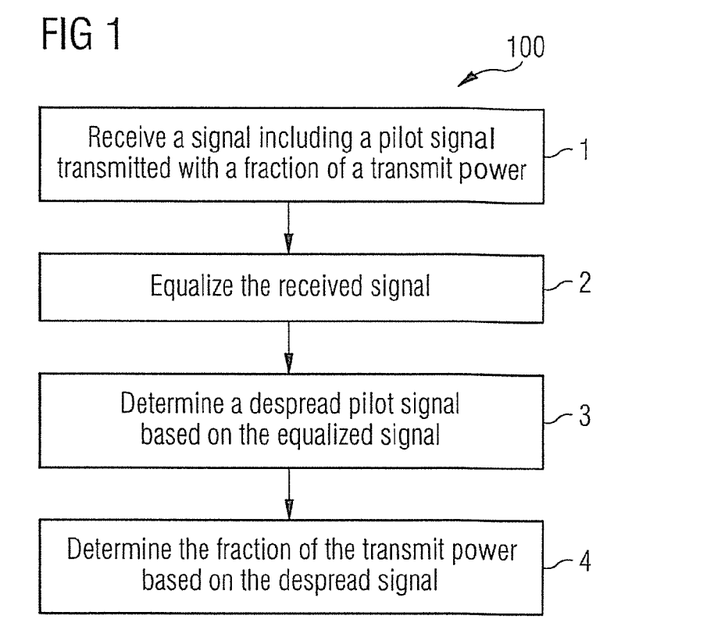
FIG. 1 is a flow chart that illustrates an exemplary method 100 for signal processing in which a fraction of a transmit power of a pilot signal is determined based on a despread pilot signal.

FIG. 1 illustrates a method 100 in accordance with the disclosure including method acts 1 to 4. At 1, a signal is received which is transmitted by a transmitter. The transmitter transmits with a transmit power and the signal includes a pilot signal transmitted by the transmitter with a fraction (or portion) of the transmit power. At 2, the received signal is equalized. At 3, a despread pilot signal is determined based on the equalized signal. At 4, the fraction of the transmit power is determined based on the despread pilot signal. It is noted that a method similar to method 100, but more detailed, is described in connection with FIG. 3.

Figure 2:
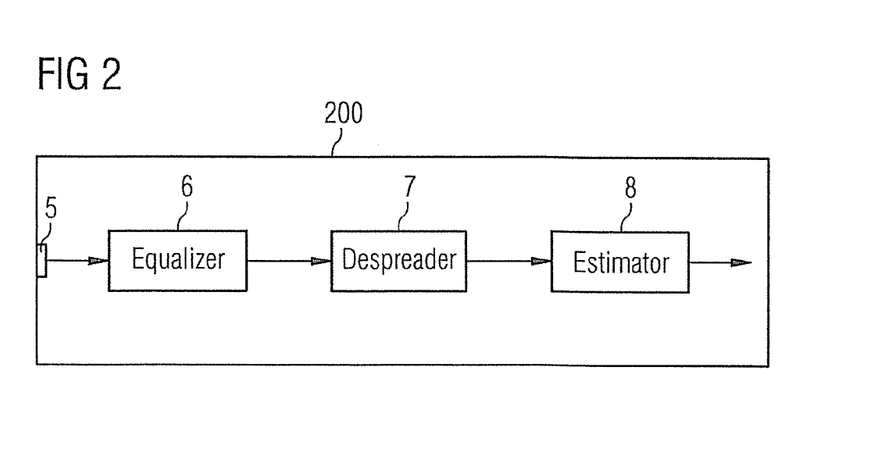
FIG. 2 is a block diagram that illustrates an exemplary circuit 200 configured to perform a signal processing, e.g. method 100.

FIG. 2 illustrates a circuit 200 in accordance with the disclosure. An operation of the circuit 200 may be read in connection with the method 100, but is not limited thereto. The circuit 200 includes an input 5 configured to receive a signal transmitted by a transmitter, wherein the transmitter transmits with a transmit power and the signal includes a pilot signal transmitted by the transmitter with a fraction of the transmit power (see method act 1 of method 100). The circuit 200 further includes an equalizer 6 arranged downstream of the input 5. The equalizer 6 is configured to perform method act 2 of method 100 in one example. The circuit 200 further includes a despreader 7 which is arranged downstream of the equalizer 6 and is configured to perform method act 3 of method 100 in one example. Further, the circuit 200 includes an estimation unit 8 which is configured to determine the fraction of the transmit power based on a despread pilot signal (see act 4 of method 100). It is noted that a circuit similar to circuit 200, but more detailed, is described in connection with FIG. 3.

In the following, method 100 and circuit 200 as well as respective extensions thereof are described more detailed. In this connection, further acts and further circuit components may be specified which may not necessarily be illustrated in the figures for the sake of simplicity. It is understood that the circuit 200 may include one or more additional components configured to perform any act described in this specification. Moreover, the circuit 200 may also include components such that the circuit 200 may additionally be configured to operate as a transmitter circuit. In addition, the circuit 200 may further include one or more (electrical) connections between included components required to perform one or more of the described acts of the method.

Figure 3:
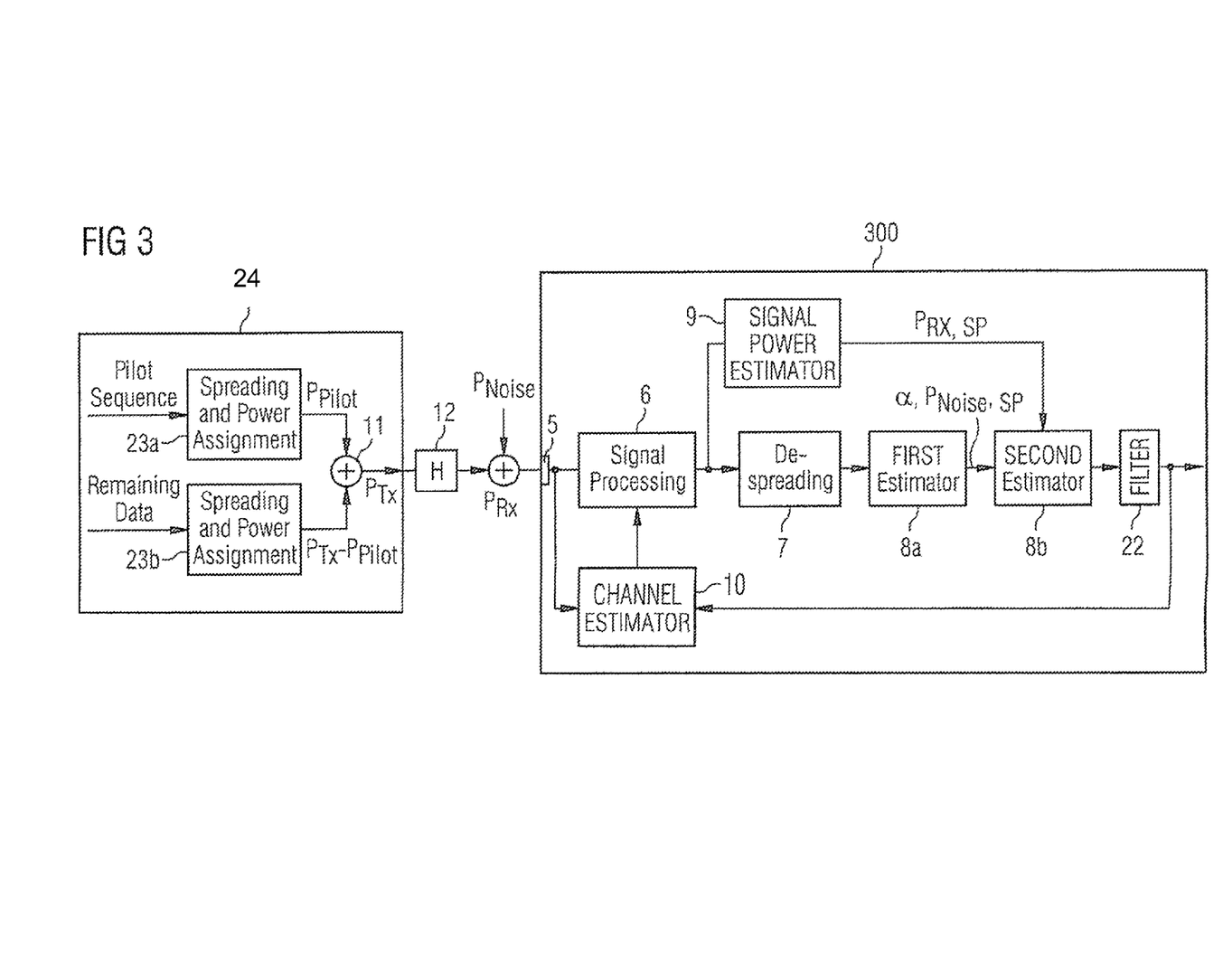
FIG. 3 is a block diagram that illustrates a radio communications system including a circuit 300.

FIG. 3 illustrates a radio communications system including a base station 24 and a circuit 300 in accordance with the disclosure. The circuit 300 may be part of a receiver, e.g. a mobile station.

The base station 24 includes units 23a and 23b as well as an adder 11. Each of the units 23a and 23b is configured to spread data input thereto using a spreading code and further configured to control or allocate a power that is to be used by the base station 24 for a transmission of the respective data over the air interface. For example, unit 23a may allocate a transmit power that is to be used by the base station 24 for broadcasting pilot signals.

During an operation of the base station 24, a pilot sequence (or a pilot signal or pilot symbols) may be input to the unit 23a and may be spread (or code-multiplexed) using a spreading code. It is noted that the term "pilot sequence" is well defined in the field of e.g. mobile radio communications. A pilot sequence may correspond to a code sequence transmitted by a base station to a mobile station. The pilot sequence may be known to the mobile station and a received pilot signal may be used by the mobile station for estimating properties of a physical communication channel. The spreading code used for spreading the pilot sequence may particularly be orthogonal to further spreading codes used for spreading other transmission data. Hence, the spread pilot data that is to be transmitted via a pilot channel is orthogonal with respect to spread data that is to be transmitted via other channels.

The unit 23a may control or allocate a transmit power that will be used by the base station 24 to transmit the spread (or code-multiplexed) pilot signals. This allocated transmit power may be a fraction of the total transmit power of all signals transmitted by the base station 24. That is, denoting the power allocated for a transmission of the pilot signal as $P_{Pilot}$ and further denoting the total transmit power used by the base station 24 as $P_{TX}$, the fraction of the transmit power allocated to the pilot signal may be denoted as $P_{Pilot}/P_{TX}$. Note that the fraction of the transmit power may be unknown to the circuit 300. The base station 24 is not necessarily restricted to only communicate with the circuit 300. Rather, the base station 24 may also communicate with additional receivers or circuits included therein at the same time. The total transmit power $P_{TX}$ of the base station 24 may then equal the sum of the powers of all signals transmitted by the base station 24 to all receivers scheduled by the base station 24.

Remaining data that is also to be transmitted by the base station 24 may be input to the unit 23b and may be spread (or code-multiplexed) using one or more spreading codes. For example, the remaining data is to be transmitted via dedicated physical channels, dedicated physical control channels, etc. The one or more spreading codes used to spread the remaining data may particularly be orthogonal to the spreading code that is used by unit 23a for spreading pilot data. A transmit power $$P_{remain} = P_{TX} - P_{Pilot} \qquad (1)$$

may be allocated by the unit 23b which will be used by the base station 24 to transmit the remaining spread data. In other words, the base station 24 splits its total used power $P_{TX}$ into two parts, namely the power $P_{Pilot}$ dedicated to the transmission of the pilot sequence and the power $P_{remain}$ dedicated to the transmission of the remaining signals. The spread data output by the units 23a and 23b is combined by the adder 11 and transmitted by one or more transmit antennas (not shown).

It is understood that the base station 24 may include additional components which are not illustrated for the sake of simplicity. For example, the base station 24 may include a digital signal processor for processing signals in the digital domain, digital filters for filtering digital signals, an encoder for encoding digital data, a scrambling unit for scrambling signals using a scrambling code, a digital/analogue converter for converting digital signals into analogue signals, an up-conversion mixer for converting the analogue signals to a radio-frequency band and/or a power amplifier, etc.

Signals transmitted by the base station 24 propagate via the physical communication channel 12 to one or more of receivers or mobile stations scheduled by the base station 24. During such transmission, the transmitted signals may be corrupted by the physical communication channel which may introduce multiple propagation paths, each with an unknown complex valued attenuation. In this connection, an orthogonality between the pilot channel and further channels may get lost due to channel properties. In addition, Additive White Gaussian Noise (AWGN) and interference may be introduced to the transmitted signals. Hence, the signal received at the circuit 300 may correspond to a sum of the channel output, AWGN and interference. The power of AWGN and interference may be jointly denoted as $P_{Noise}$, i.e.

$$P_{Noise} = P_{AWGN} + P_{Interference}. \quad (2)$$

The circuit 300 may be included in a receiver, for example a mobile station. The circuit 300 includes an input 5, a signal processing unit 6, a despreader 7, a first estimation unit (or estimator) 8a, a second estimation unit 8b, a signal power estimator 9, a channel estimator 10 and an (optional) filter 22.

It is understood that the circuit 300 may include further components which are not illustrated for the sake of simplicity. For example, the circuit 300 may include further inputs (or ports) that may be coupled to one or more antennas. In addition, the circuit 300 may include one or more of a digital signal processor, a down-conversion mixer for down-converting received signals to an intermediate band or a baseband, a sampling unit for sampling a signal, an analogue/digital converter for converting the analogue received signal into a digital signal. It is noted that such components may particularly be arranged between the input 5 and the signal processing unit 6 such that a digital baseband signal may be input to the signal processing unit 6 and the channel estimator 10, respectively. The circuit 300 may also include additional components for processing Dedicated Physical Channel (DPCH) data.

The circuit 300 may not necessarily include only one circuit or chip. It is also possible that one or more components of the circuit 300 may be arranged in one or more separate circuits and/or even on one or more physically separate substrates. Hence, the circuit 300 may have two or more physically separate substrates (or chips) that may be connected by an interface, e.g. an RF (Radio Frequency)/BB (Base Band) interface.

During an operation of the circuit 300, signals are received at the input 5 wherein the power $P_{RX}$ of the received signal may be expressed by $$P_{RX} = |H|^2 P_{TX} + P_{Noise}. \quad (3)$$

Mathematically, H may denote a channel operator that may map a signal that is to be transmitted to the respective received signal that has been propagated over a physical communication channel. The norm $|H|^2$ may denote a power of the channel H or the change in the power of a signal that is transmitted over the channel H. In practice, a representation of H may depend on the considered communications system. For a single propagation path, H may correspond to a complex number. For the case of multiple propagation paths, H may correspond to a channel impulse response (in the time domain) or a channel frequency response (in the frequency domain). For the case of a MIMO system, H may correspond to a channel matrix having a dimension of $N_{RX} \times N_{TX}$ wherein $N_{TX}$ denotes the number of transmit antennas (at a transmitter, e.g. a base station) and $N_{RX}$ denotes the number of reception antennas (at a receiver, e.g. a mobile station). Each entry of such channel matrix may correspond to a channel variable as described above, i.e. a complex number, a channel impulse response, a channel frequency response. The input 5 may e.g. correspond to a port that may be coupled to one or more antennas (not shown) of the receiver. The received data may be processed by above mentioned components such that a digital baseband signal may be input to the signal processing unit 6 and the channel estimator 10, respectively.

The channel estimator 10 may estimate the channel, thereby determining at least one channel coefficient H. Note that the channel estimator 10 may particularly operate in the digital domain. For example, estimating the channel may be based on a pilot sequence known to the circuit 300. Additional components may be arranged between the input 5 and the channel estimator 10 in order to determine a (digital and base band) pilot sequence required for a channel estimation. An estimate $\overline{H}$ of the channel may be provided to the signal processing unit 6.

Since only an unknown fraction of the transmit power $P_{TX}$ is allocated to the pilot sequence, the estimate $\overline{H}$ of the channel H may be scaled depending on the power $P_{Pilot}$ allocated to the pilot signal. Such scaling may be expressed as $$|\overline{H}|^2 = P_{Pilot} |H|^2 \quad (4a)$$

wherein $|\overline{H}|^2$ denotes the estimated power of the channel and $|H|^2$ denotes the actual power of the channel. Equation (4a) may be transformed to $$P_{Pilot} = |\overline{H}|^2 |H|^{-2} \quad (4b)$$

Note that each of equations (4a) and (4b) may include additional coefficients such that both sides of the respective equation are of identical physical units.

The signal processing unit 6 may correspond to or may include a channel equalizer which is configured to channel equalize a digital baseband input to the signal processing unit 6. Such channel equalization may remove detrimental effects generated by the physical communication channel H such that at an output of the channel equalizer ideally AWGN conditions may be established. After the channel equalization an orthogonality between the (still spread) pilot signal and further (still spread) data that has been lost due to the channel may be reestablished.

It is understood that the channel equalization performed by the signal processing unit 6 is not restricted to a specific equalization scheme. For example, the performed channel equalization may be linear or non-linear. The equalization may be based on one of the following schemes: Minimum Mean Square Error (MMSE), Zero Forcing (ZF), Maximum Ratio Combining (MRC) and Matched Filter Maximum Ratio Combining (MF-MRC). In particular, the channel equalization may be based on channel coefficients provided by the channel estimator 10.

The channel equalization performed by the signal processing unit 6 may be seen as an inversion of the channel H, the inversion being scaled by a, e.g. real valued, scaling factor $\alpha$, i.e. $\alpha \overline{H}^{-1}$. It is noted that the channel equalized signal may still include both, the pilot sequence and the remaining data that have been transmitted by the base station 24 (see units 23a and 23b).

The channel equalized (or signal processed) signal may be forwarded to the signal power estimator 9. The signal power estimator 9 may determine a signal power $P_{RX,SP}$ of the channel equalized signal as $$P_{RX,SP} = \alpha^2 |\overline{H}|^{-2} P_{RX}. \quad (5)$$

Combining equations (3) and (5a) gives $$P_{RX,SP} = \alpha^2 |\overline{H}|^{-2} (|H|^2 P_{TX} + P_{Noise}) \quad (5b)$$

and $$\alpha^2 |\overline{H}|^{-2} |H|^2 P_{TX} = P_{RX,SP} - \alpha^2 |\overline{H}|^{-2} P_{Noise}, \quad (5c)$$

respectively. It is noted that an arbitrary method may be used for determining the signal power $P_{RX,SP}$ which may be forwarded to the second estimator 8b.

The channel equalized signal output by the signal processing unit 6 may include the spread pilot signal and the remaining data spread by other spreading code(s). The channel equalized signal may be forwarded to the despreader 7 where it may be despread. Since the pilot signal is orthogonal to all further data, the pilot sequence may be despread using the associated spreading code. The determined despread pilot signal may be forwarded to the first estimator 8a. It is understood that data included in the channel equalized signal and spread by other spreading codes may also be despread either and may be forwarded to arbitrary components of the circuit 300.

The exact pilot sequence that has been used by the unit 23a of the base station 24 may particularly correspond to a symbol sequence having a scaling of e.g. one. Note that a different scaling may be chosen as well. Of course, the despread pilot signal received by the first estimator 8a does not necessarily equal the exact pilot sequence. Compared to the exact pilot sequence, the despread pilot sequence output by the despreader 7 may be scaled by the scaling factor α of equation (5a). In addition, the despread pilot sequence may deviate from the exact pilot sequence due to noise. That is, the despread pilot sequence may correspond to a noisy signal oscillating (or dithering) around the constant values of the exact pilot sequence.

The first estimator 8a may average the despread pilot signal and may estimate the scaling factor α based on the determined average. Here, a deviation between the averaged despread pilot signal and the exact known pilot sequence may be determined. The scaling a may then be determined from the determined deviation. Assuming the scaling of the exact pilot sequence to be one, the scaling factor α may merely depend on the average of the despread pilot signal. The determined scaling a may be forwarded to the second estimator 8b.

The first estimator 8a may determine a noise power $P_{Noise,SP}$ of the despread pilot signal which may be expressed as $$P_{Noise,SP} = \alpha^2 |\overline{H}|^{-2} P_{Noise}. \quad (6)$$

The power $P_{Noise,SP}$ may be determined based on deviations between the noisy despread pilot sequence and the exact (constant) pilot sequence. An increased noise in the despread signal may result in a fuzzier despread pilot sequence, i.e. an increased dithering of the despread signal around the exact constant pilot sequence values. Hence, the deviations (or the power of these deviations or an average thereof) may be seen as a measure of the noise power $P_{Noise,SP}$ of the despread pilot signal. The determined noise power $P_{Noise,SP}$ may be forwarded to the second estimator 8b.

Using equation (4b), the fraction $P_{Pilot}/P_{TX}$ may be expressed by $$\frac{P_{Pilot}}{P_{TX}} = \frac{1}{|\overline{H}|^{-2}|H|^2 P_{TX}} \quad (7a)$$

or (multiplying the numerator and the denominator with a factor $\alpha^2$)

$$\frac{P_{Pilot}}{P_{TX}} = \frac{\alpha^2}{\alpha^2 |\overline{H}|^{-2}|H|^2 P_{TX}}. \quad (7b)$$

Combining equations (7b) and (5c) results in $$\frac{P_{Pilot}}{P_{TX}} = \frac{\alpha^2}{P_{RX,SP} - \alpha^2 |\overline{H}|^{-2} P_{Noise}} \quad (7c)$$

and further using equation (6) gives $$\frac{P_{Pilot}}{P_{TX}} = \frac{\alpha^2}{P_{RX,SP} - P_{Noise,SP}}. \quad (7d)$$

The second estimator 8b receives the noise power $P_{Noise,SP}$ and the scaling factor α from the first estimator 8a, respectively, and further receives the signal power $P_{RX,SP}$ from the signal power estimator 9. Based on these received values, the second estimator 8b may determine the fraction $P_{Pilot}/P_{TX}$ according to equation (7d). It is noted that, leaving aside unavoidable estimation errors occurring at an estimation of the values $P_{Noise,SP}$, α and $P_{RX,SP}$, the circuit 300 may determine the value of the fraction $P_{Pilot}/P_{TX}$ exactly in one example. The fraction may $P_{Pilot}/P_{TX}$ may be forwarded to the (optional) filter 22.

Signals may be divided into subsequent time slots such as e.g. in UMTS where a time slot may have 2560 chips. It is noted that the terms "slot", "time slot", "frame", "chip" are well known in the field of mobile communications. The fraction $P_{Pilot}/P_{TX}$ may be determined on a slot-by-slot basis, i.e. for each of subsequent time slots. That is, measurements associated with time slots differing from the current time slot are not taken into account. A signal processing on a slot-by-slot basis may reduce an amount of required memory.

In practice, determined values of the fraction $P_{Pilot}/P_{TX}$ may be noisy and include fluctuations. In such case, the fraction $P_{Pilot}/P_{TX}$ may be filtered by the filter 22 over a plurality of time slots. For example, the filter 22 may correspond to or may include a low pass filter. It is understood that the number of time slots chosen for such temporal filtering is arbitrary and may particularly depend on a current communication scenario. In particular, a number of chosen time slots may depend on temporal changes of the base station's transmit power. Consider, for example, a communication between a base station and only one mobile station. In a first scenario, the mobile station may be employed by a user to browse the internet such that a data transmission between the base station and the mobile station may particularly occur or increase when the user requests such data, for example by requesting a webpage. At a request time, this may result in a burst of transmission data and thus a peak of the base station's transmit power. In a second scenario, the mobile station may be employed by the user for downloading a data file from a data server with a constant download rate. Here, the transmit power of the base station may remain at a relatively constant value. Comparing now the first and second scenario, a number of time slots chosen for filtering the fraction $P_{Pilot}/P_{TX}$ may be chosen to be smaller for the first scenario in order to account for stronger fluctuations of the base station's transmit power. Contrarily, the number of chosen time slots may be increased for the second scenario due to the more constant transmit power of the base station. It is noted that increasing the number of chosen time slots may correspond to decreasing a bandwidth of a used low pass filter and vice versa.

Alternatively or additionally to filtering the fraction $P_{Pilot}/P_{TX}$, a temporal filtering may be applied to at least one of the values $P_{RX,SP}$, α and $P_{Noise,SP}$. For example, each of the values $P_{RX,SP}$, α and $P_{Noise,SP}$ may be filtered such that values already filtered are input to the second estimator 8b. The second estimator 8b may then perform an additional filtering of the fraction $P_{Pilot}/P_{TX}$. In case of additional filtering, the circuit 300 may include one or more further filters, e.g. low pass filters, that may be arranged between the signal power estimator 9 and the second estimator 8b (e.g. for filtering $P_{RX,SP}$) and/or between the first estimator 8a and the second estimator 8b (e.g. for filtering α and/or $P_{Noise,SP}$).

The filtered fraction $P_{Pilot}/P_{TX}$ may be fed back to the channel estimator 10 and/or to one or more further components of the circuit 300 and/or components of the receiver including the circuit 300. The channel estimator 10 may use the received values of the fraction $P_{Pilot}/P_{TX}$ to scale channel estimation values. This way, a scaling as in equation (4a) may be corrected. If the circuit 300 does not include (or does not use) the filter 22, the values of the fraction $P_{Pilot}/P_{TX}$ may be fed back from the second estimator 8b to the channel estimator 10.

Comparing FIGS. 2 and 3, the equalizer 6 of FIG. 2 may be identified with the signal processing unit 6 of FIG. 3 and the estimation unit 8 of FIG. 2 may be identified with the second estimator 8b of FIG. 3. Alternatively, the estimation unit 8 of FIG. 2 may be identified with both estimators 8a and 8b of FIG. 3.

Figure 4:
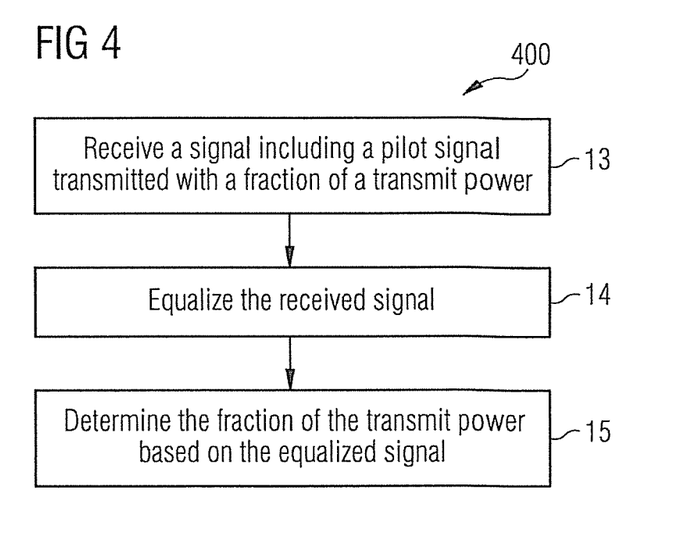
FIG. 4 is a flow chart that illustrates an exemplary method 400 for signal processing in which a fraction of a transmit power of a pilot signal is determined based on an equalized signal.

FIG. 4 illustrates a method 400 in accordance with the disclosure including acts 13 to 15. All comments made in connection with previously described methods may also hold true for method 400. At 13, a signal transmitted by a transmitter is received. The transmitter transmits with a transmit power and the signal includes a pilot signal transmitted by the transmitter with a fraction of the transmit power. At 14, the received signal is equalized. At 15, the fraction of the transmit power is determined based on the equalized signal.

Figure 5:
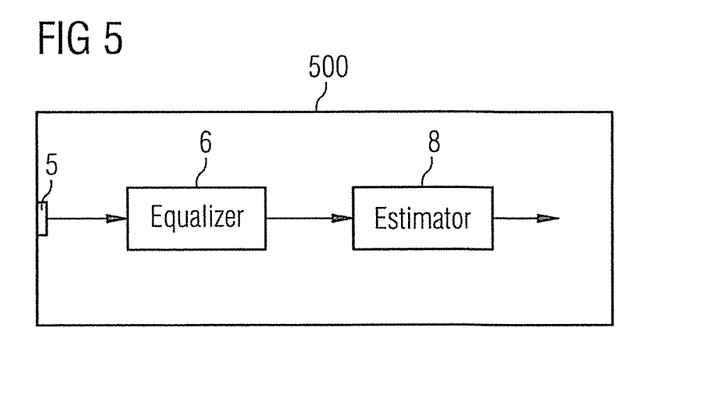
FIG. 5 is a block diagram that illustrates an exemplary circuit 500 configured to perform a signal processing, e.g. method 400.

FIG. 5 illustrates a circuit 500 in accordance with the disclosure. The circuit 500 may include further components, e.g. one or more components described in connection with FIG. 3. An operation of the circuit 500 may be read in connection with the method 400, but is not limited thereto. The circuit 500 includes an input 5 configured to receive a signal transmitted by a transmitter. The transmitter transmits with a transmit power and the signal includes a pilot signal transmitted by the transmitter with a fraction of the transmit power (see method step 13 of method 400). The circuit 500 further includes an equalizer 6 arranged downstream of the input 5. The equalizer 6 is configured to perform act 14 of method 400 in one example. The circuit 500 further includes an estimation unit 8 arranged downstream of the equalizer 6. The estimation unit 8 is configured to determine the fraction of the transmit power based on an equalized signal (see act 15 of method 400) in one example.

Comparing FIGS. 3 and 5, the equalizer 6 of FIG. 5 may be identified with the signal processing unit 6 of FIG. 3 and the estimation unit 8 of FIG. 5 may be identified with the second estimator 8b of FIG. 3. Alternatively, the estimation unit 8 of FIG. 5 may be identified with both estimators 8a and 8b of FIG. 3.

Figure 6:
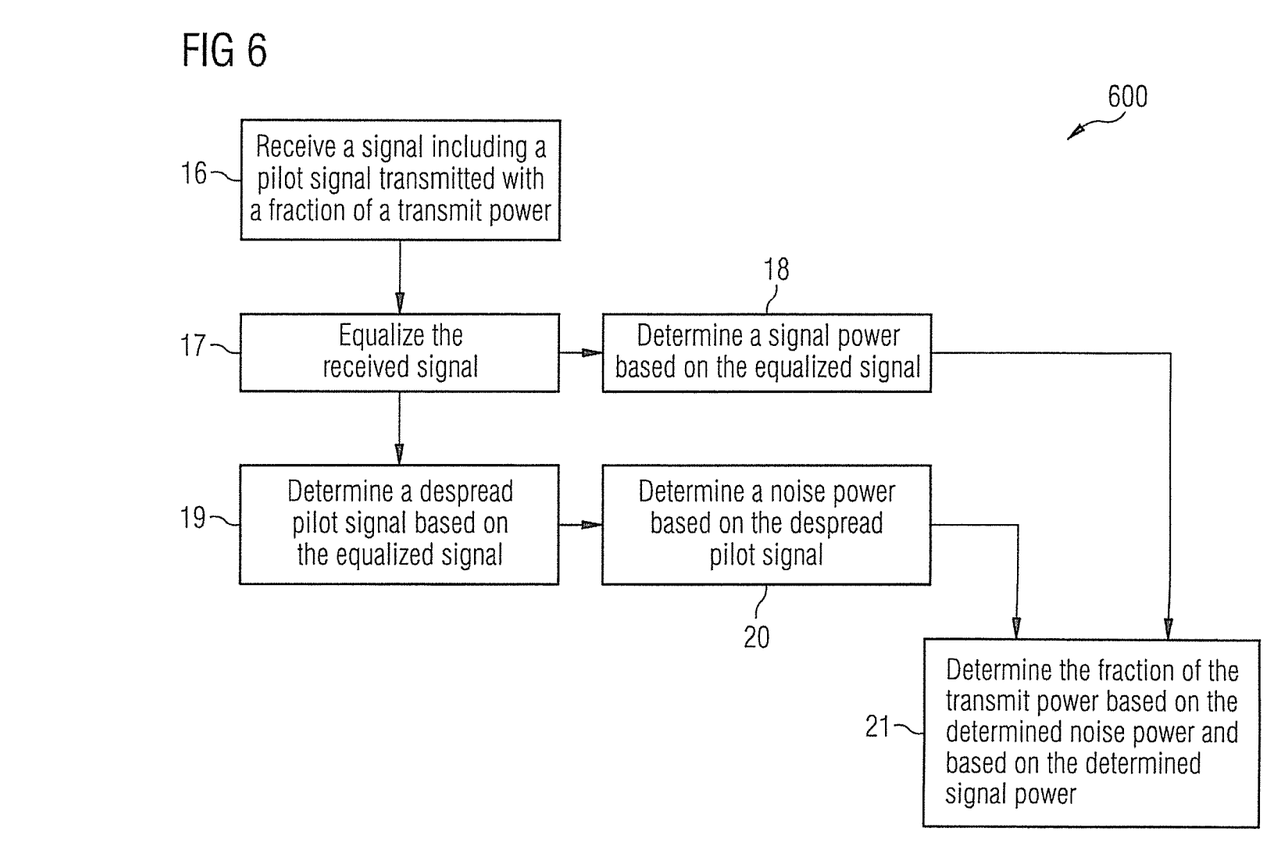
FIG. 6 is a flow chart that illustrates an exemplary method 600 for signal processing in which a fraction of a transmit power of a pilot signal is determined based on a signal power and a noise power, wherein the signal power is based on an equalized signal and the noise power is based on a despread pilot signal.

FIG. 6 illustrates a method 600 in accordance with the disclosure including acts 16 to 21. The method 600 may e.g. be performed by the circuit 300 of FIG. 3 in one example. All comments made in connection with previously described methods may also hold true for method 600. At 16, a signal transmitted by a transmitter is received. The transmitter transmits with a transmit power and the signal includes a pilot signal transmitted by the transmitter with a fraction of the transmit power. At 17, the received signal is equalized. At 18, a signal power is determined based on the equalized signal. At 19, a despread pilot signal is determined based on the equalized signal. At 20, a noise power is determined based on the despread pilot signal. At 21, the fraction of the transmit power is determined based on the determined noise power and based on the determined signal power.

While the disclosure has been illustrated and described with respect to one or more implementations, alterations and/or modifications may be made to the illustrated examples without departing from the spirit and scope of the appended claims. Also, techniques, systems, subsystems and methods described and illustrated in the various aspects may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
   receiving a signal transmitted by a transmitter wherein the transmitter transmits with a transmit power and the signal comprises a pilot signal transmitted by the transmitter with a fraction of the transmit power;
   equalizing the received signal;
   determining a despread pilot signal based on the equalized signal; and
   determining the fraction of the transmit power based on the despread pilot signal.

2. The method of claim 1, further comprising:
   determining a noise power based on the despread pilot signal, wherein determining the fraction of the transmit power is further based on the determined noise power.

3. The method of claim 1, further comprising:
   determining a signal power based on the equalized signal, wherein determining the fraction of the transmit power is further based on the determined signal power.

4. The method of claim 1, further comprising:
   averaging the despread pilot signal; and
   determining a scaling factor based on the averaged despread pilot signal, wherein determining the fraction of the transmit power is further based on the scaling factor.

5. The method of claim 4, wherein equalizing the received signal depends on the scaling factor.

6. The method of claim 1, wherein the fraction of the transmit power is determined for each of a plurality of subsequent time slots.

7. The method of claim 6, further comprising:
   filtering the determined fraction of the transmit power over the plurality of time slots.

8. The method of claim 1, further comprising:
   low pass filtering the determined fraction of the transmit power.

9. The method of claim 1, further comprising:
   determining at least one channel estimation value based on the received signal; and
   scaling the at least one channel estimation value based on the determined fraction of the transmit power.

10. The method of claim 1, wherein:
    the signal is received at a receiver circuit; and
    the transmit power is the total power of all signals transmitted by the transmitter.

11. A circuit, comprising:
    an input configured to receive a signal transmitted by a transmitter, wherein the transmitter transmits with a transmit power and the signal comprises a pilot signal transmitted by the transmitter with a fraction of the transmit power;

an equalizer arranged downstream of the input, and configured to equalize the received signal;
a despreader arranged downstream of the equalizer, and configured to despread the pilot signal based on the equalized signal; and
an estimation unit configured to determine the fraction of the transmit power based on the despread pilot signal.

12. The circuit of claim 11, further comprising:
a noise power estimator arranged downstream of the despreader, and configured to estimate a noise power associated with the received signal, wherein the determined fraction of the transmit power is based on the noise power, and wherein the noise power is based on the despread pilot signal.

13. The circuit of claim 11, further comprising:
a signal power estimation unit arranged downstream of the equalizer and configured to determine a signal power based on the equalized signal, wherein the determined fraction of the transmit power is based on the determined signal power.

14. The circuit of claim 11, further comprising:
a further estimation unit configured to average a despread pilot signal and configured to determine a scaling factor based on the averaged despread pilot signal, wherein the determined fraction of the transmit power is further based on the scaling factor.

15. The circuit of claim 11, further comprising:
a channel estimator coupled to an input of the equalizer and to an output of the estimation unit, and configured to receive the determined fraction of the transmit power, and further configured to scale at least one channel estimation value based on the received determined fraction of the transmit power.

16. The circuit of claim 11, further comprising:
a filter arranged downstream of the estimation unit and configured to filter the determined fraction of the transmit power over multiple time slots.

17. The circuit of claim 11, further comprising:
a low pass filter arranged downstream of the estimation unit.

18. A method, comprising:
receiving a signal transmitted by a transmitter, wherein the transmitter transmits with a transmit power and the signal comprises a pilot signal transmitted by the transmitter with a fraction of the transmit power;
equalizing the received signal;
determining a signal power based on the equalized signal; and
determining the fraction of the transmit power based on the equalized signal and the determined signal power.

19. The method of claim 18, further comprising:
determining a despread pilot signal based on the equalized signal; and
determining a noise power based on the despread pilot signal, wherein determining the fraction of the transmit power is further based on the determined noise power.

20. A circuit, comprising:
an input configured to receive a signal transmitted by a transmitter, wherein the transmitter transmits with a transmit power and the signal comprises a pilot signal transmitted by the transmitter with a fraction of the transmit power;
an equalizer arranged downstream of the input, and configured to equalize the received signal;
an estimation unit arranged downstream of the equalizer and configured to determine the fraction of the transmit power based on the equalized signal; and
a signal power estimation unit arranged downstream of the equalizer and in parallel with the estimation unit, and configured to determine a signal power based on the equalized signal and the determined fraction of the transmit power, an output of the signal power estimation unit being coupled to an input of the estimation unit.

21. The circuit of claim 20, further comprising:
a despreader arranged downstream of the equalizer, and configured to despread the pilot signal based on the equalized signal; and
a noise power estimator arranged downstream of the despreader and configured to determine a noise power based on the despread signal.

22. A method, comprising:
receiving a signal transmitted by a transmitter, wherein the transmitter transmits with a transmit power and the signal comprises a pilot signal transmitted by the transmitter with a fraction of the transmit power;
equalizing the received signal;
determining a signal power based on the equalized signal;
determining a despread pilot signal based on the equalized signal;
determining a noise power based on the despread pilot signal; and
determining the fraction of the transmit power based on the determined noise power and based on the determined signal power.

23. The method of claim 22, further comprising:
averaging the despread pilot signal; and
determining a scaling factor based on the averaged despread pilot signal, wherein equalizing the received signal is based on the scaling factor, and wherein determining the fraction of the transmit power is further based on the scaling factor.

* * * * *